United States Patent [11] 3,612,316

[72] Inventors Floyd G. Baldwin
  Long Beach;
  Raymond P. Brenner, Whittier, both of Calif.
[21] Appl. No. 887,124
[22] Filed Dec. 22, 1969
[45] Patented Oct. 12, 1971
[73] Assignee McDonnell Douglas Corporation

[54] CARGO LOADING AND RESTRAINT SYSTEM
  4 Claims, 7 Drawing Figs.
[52] U.S. Cl. .................................................. 214/516,
  198/165, 214/84, 244/137
[51] Int. Cl. ..................................................... B60p 1/64
[50] Field of Search .......................................... 198/165,
  19, 160, 173, DIG. 19; 193/40, 32; 214/84, 83, 36,
  516; 244/137

[56] References Cited
  UNITED STATES PATENTS
3,416,642 12/1968 Muller .............................. 198/19 X
3,424,209 1/1969 Settembrini .................. 198/19 X

*Primary Examiner*—Evon C. Blunk
*Assistant Examiner*—Hadd S. Lane
*Attorneys*—Walter J. Jason, Donald L. Royer and Robert O. Richardson ABSTRACT: A cargo loading and restraint system within the cargo deck of an aircraft in the form of a conveyor mechanism involving an endless chain assembly continuously operated by a suitable motor. The chain comprises a plurality of interconnected rollers with support pads which are raised by inflatable bags positioned thereunder to contact the bottom surface of cargo pallets to be moved on support rollers from station to station on the cargo deck. The frictional engagement of the support pads with a cargo container moves it to the next station on the support rollers. Each station has its own inflatable bag to be inflated and deflated as desired to move or halt the movement of the pallets along the cargo deck. A latch system is interlocked to the drive system for quickly locking down the containers for pallets when they reach selected positions on the cargo deck and to deflate bags at those stations to release the drive system from the locked pallets.

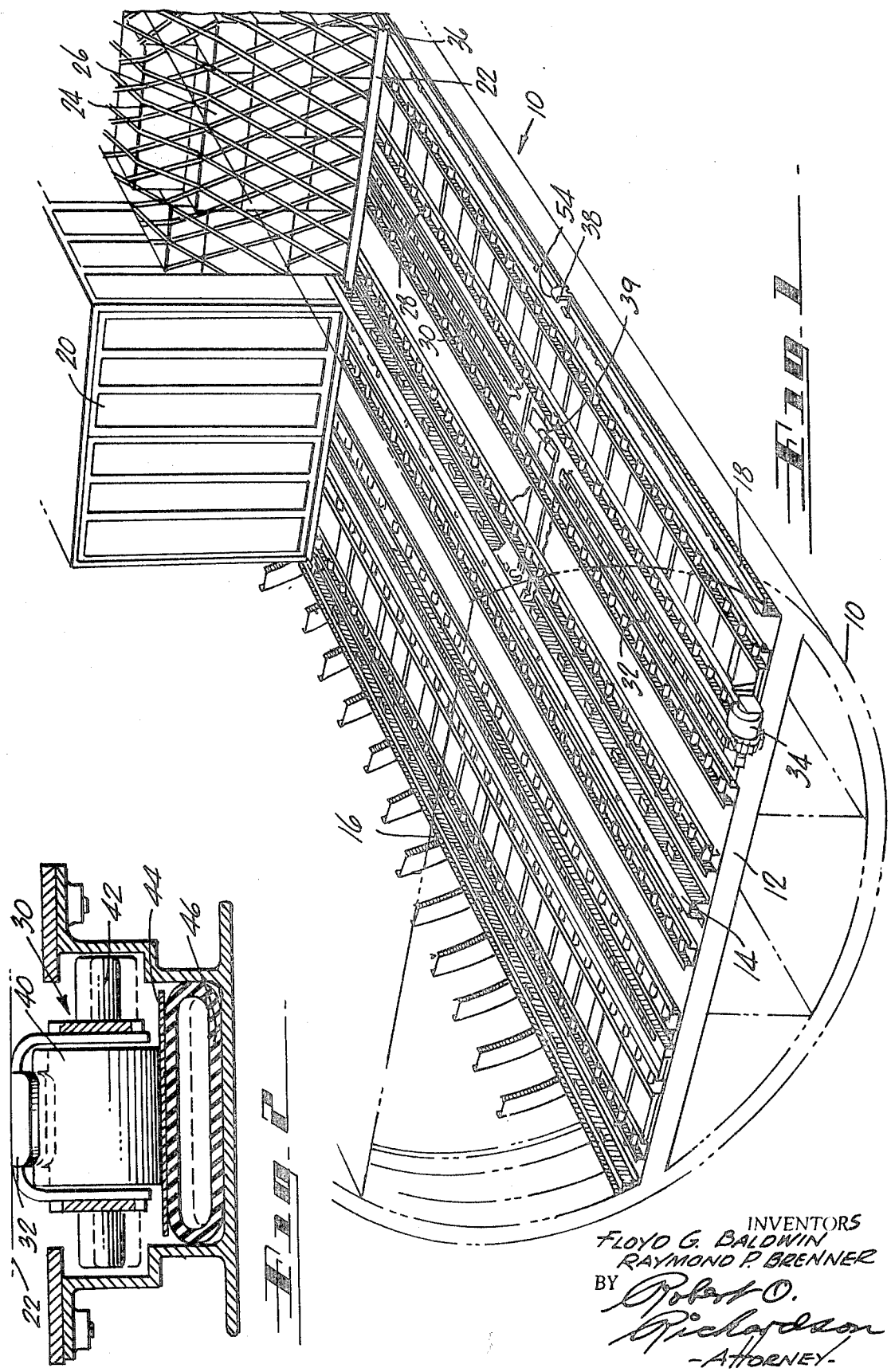

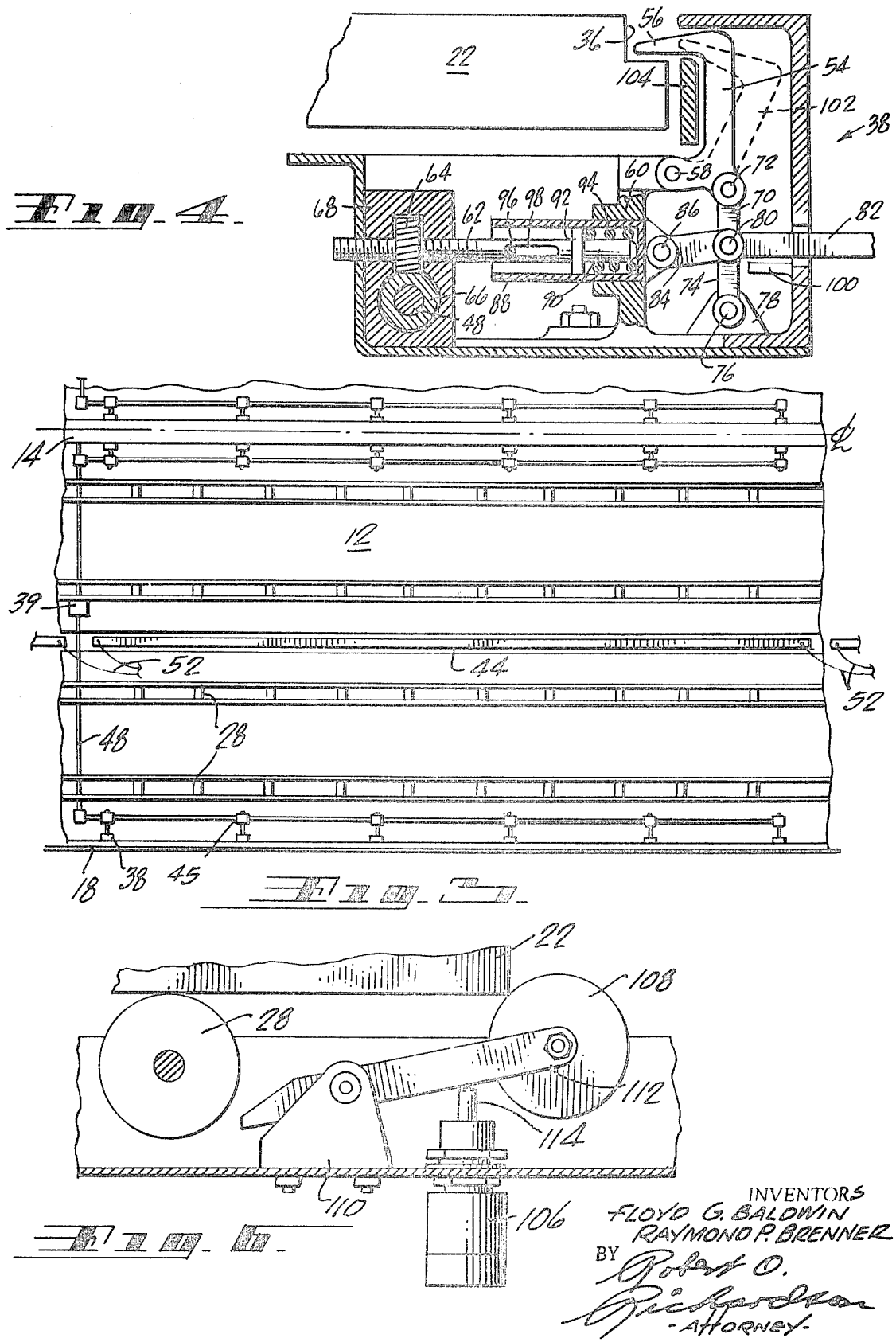

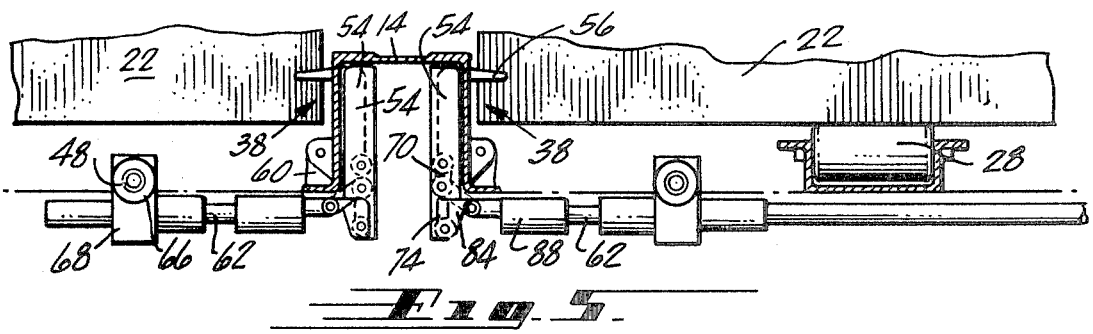

CARGO LOADING AND RESTRAINT SYSTEM

BACKGROUND OF THE INVENTION

Cargo aircraft proposed for future use face several loading problems. The aircraft diameter must be as small as possible in order to have a minimum of aerodynamic drag. This calls for minimum spacing around the payload so that no walkways are permitted for access to the cargo restraint systems. During the turnaround time of the aircraft, manpower requirements must be as small as possible and yet the time be held to a minimum to achieve the best profit realization for the aircraft. Preferably, aircraft loading and unloading should be less time than is required for other servicing of the aircraft.

SUMMARY OF THE PRESENT INVENTION

A cargo loading and restraint system has been provided wherein a plurality of containers or pallets for cargo are moved along an aircraft cargo deck to selected positions where they are locked into position for aircraft flight. The multiple positions are interlocked to provide a sequencing function so that as a pallet reaches the rearwardmost selected position, a selector switch causes the latching pawls to operate to lock the pallet in position and to cause the loading apparatus to stop the next pallet at the station next preceding that one. When the container comes into the selected storage position, the latch pawls engage the container and this sequence of events continues until all desired positions are filled with cargo. The unlatching and moving function can be selected for any sequence of containers or pallets starting from the front of the airplane. This is accomplished by means of selector switches on an operator's panel mounted conveniently within the aircraft or on ground support equipment to be used therewith. As the unlatched function takes place, the cargo-loading drive system automatically engages the selected containers and unloads them. The remaining load in the aircraft may be repositioned as desired by using the proper selection of latch and unlatch switches. By using this system, by way of example, the complete unload-load cycle for 26, 8'×8'×10' containers or pallets weighing approximately 12,500 pounds each can be accomplished by one man in less than 20 minutes.

BRIEF DESCRIPTION OF THE DRAWINGS

FIG. 1 is a perspective view showing the conveyor system on the aircraft floor;

FIG. 2 is an elevational sectional view of the cargo moving apparatus;

FIG. 3 is a plan view of the floor structure of one station;

FIG. 4 is an elevational view partly in section of the pallet restraint bracket;

FIG. 5 is an elevational view partly in section showing the latching pawls at the centerline divider strip;

FIG. 6 is an elevational view showing limit switch operation in response to container movement; and FIG. 7 is a cargo-loading system sequencing chart.

Referring now to FIG. 1 there is shown in phantom an outline of an aircraft fuselage 10 having a floor 12 upon which is installed the cargo-handling system of the present invention. A centerline divider strip 14 and guide rails 16 and 18 define separate cargo-handling systems. A cargo container 20 and a cargo pallet 22 with cargo straps 24 for containing a plurality of irregular cargo objects 26 illustrate typical cargo units to be loaded. Between centerline divider strip 14 and guide rail 18 are four rows of rollers 28 for supporting pallet 22. Centrally positioned is an endless chain 30 on which are mounted connecting lugs 32 for engagement with the undersurface of pallet 22 to move it along the floor 12 to its stored position. A chain drive motor 34 causes the endless chain to move continuously, although provision is made for the lugs 32 thereon to become depressed and out of engagement with those pallets that are in their designated stored position. The engagement and disengagement of the lugs with the undersurface of the pallet 22 may be done, for example, by raising and lowering of the chain 30 by means of an inflatable tube thereunder. This tube, when inflated, causes the lugs to contact and move the pallet and, when deflated, permits the lugs to become disengaged while the pallet rests on the support rollers 28. Pallet 22 has a plurality of recesses 36 for engagement with cargo pallet restraint brackets 38, positioned along guide rail 18 and centerline divider strip 14 to hold the pallets in position. These restraint brackets move inwardly into the recessed 36 of the pallet by an electric motor 39 through a drive shaft system which drives all cargo pallet restraint brackets 38 inwardly at selected stations to restrain securely those pallets positioned at those stations. Similar apparatus is positioned on the floor 12 between centerline dividers strip 14 and rail 16 for the movement and restraint of cargo container 20.

A sectional view of the endless chain 30 and the manner in which it selectively engages and moves pallets 22 is shown in FIG. 2. Here is shown a roller 40 having a lug 32 mounted thereover and mounted on roller axle 42. This roller rolls on protecting plate 44 which is positioned over an inflatable tube 46 and vertically movable thereby. When tube 46 is inflated, lug 32 engages the bottom of cargo pallet 22 and moves it along the storage trackway. Tubes 46 are in sections so that when all rollers 40 over a section are depressed, upon the deflation of tube 46, the cargo pallet positioned thereover is no longer moved and it may then be locked into position by the cargo pallet restraint brackets 38, as will be more fully explained hereinafter.

In FIG. 3 there is shown a plan view of the aircraft floor 12 of one station for pallet storage. Pallets have been standardized to be 8 feet in width by 10 feet in length or multiples thereof. Within the 10-foot length are six restraint brackets 38 on each side for engagement with the pallet. These 12 brackets are simultaneously operated by motor 39 through a shaft system 48 which operates a driving mechanism such as a screwjack 45 for each bracket. As motor 39 turns shafts 48, the brackets 38 move inwardly to engage the pallet or move outwardly to disengage the pallet, depending upon the actuation of suitable switches. The protecting plate 44 is shown upon which the rollers of the endless chain, not shown, pass in either elevated position to move the pallet or in recessed position to permit passage of the drive chain without causing the cargo to move. Plate 44 is raised and lowered by fluid-conducting lines 52 which interconnect the inflatable tubes 46 (see FIG. 2) with a fluid source.

Referring now to FIG. 4, the cargo pallet restraint bracket 38 is shown in section. This consists of a latching pawl 54 with a cargo-engaging lip 56 adapted to engage pallet 22 at its recess 36. This pawl is pivotally mounted at 58 to a mounting bracket 60. Pawl 54 is moved between its unlocked position shown in dashed lines and its locked position shown in solid lines by means of overcenter linkage connected to a threaded actuator 62 which is connected to a threaded pinon 64. This threaded pinon 64 is turned by worm gear 66 on a motor driven connecting shaft 48 journaled within gearbox 68. The overcenter linkages consist of a link 70 connected at pivot 72 to pawl 54 and link 74 connected at pivot 76 to support bracket 78. The two links, 70 and 74, are pivotally connected at 80 to a third link 82 which may be used to actuate a switch or valve, not shown, for inflating and deflating the tube 46 in FIG. 2. These links 70, 74 are also connected to an idler link 84 which, in turn, is connected at pivot 86 to spring housing 88. Within this spring housing is the end 90 of actuator 62. A collar 92 is mounted on end 90 and a spring 94 is positioned between this collar and the end of housing 88. A pin 96 in housing 88 passes through a slot 98 in the actuator 62 to permit lateral movement without separation. Housing 88 is mounted within bracket 60 for lateral movement. As connecting shaft 48 rotates in response to an electric motor drive, not shown, it causes threaded pinon 64 to rotate within the gearbox 68. This rotation, in turn, causes the threaded actuator 62 to move in a transverse direction and thus compress spring 94. When pallet opening 36 moves into alignment with pawl lip 56, the spring 94 urges the pivot point 80 between links 70 and 74 to move from its position shown in dotted line to its position shown in solid line and pawl 54 moves into its locked position against stop 100. By recompressing the spring 94 with a further lateral movement of actuator 62, idler link 84 keeps these links 70, 74 locked in this overcenter position to thus firmly lock pawl 54 in place. When pivot point 80 is moved inwardly to its dotted line position, pawl 54 moves to its unlocking dotted line position 102, also. Guide rail 18 is provided with a stop rail 104 against which pawl 54 abuts when in locked position.

In FIG. 5 there is shown the relationship between stations on adjacent tracks with the adjacent pallet restraint brackets positioned within the centerline divider strip 14. This divider strip is of inverted-U channel configuration with the locking pawls 54 mounted therein and the pallet engaging lips 56 extending outwardly therethrough. The construction and operation of the pallet restraint brackets 38 is similar to that shown in FIG. 4, and accordingly, further discussion is not deemed to be necessary.

Referring now to FIG. 6, there is shown an electrical switch 106 which may be used to actuate pallet-locking pawls. If the locking pawls are not adapted to actuate the cargo movement apparatus, such as inflating and deflating the tube 46 in FIG. 2, as described in reference to the pawl in FIG. 4, this switch then may also be used for that purpose. Roller 108 is mounted on a bracket 110 through a lever arm 112 which rests against plunger 114. The normal position of roller 108 is above the plane of support rollers 28 and is depressed when pallet 22 passes thereover. This causes plunger 114 to be depressed and thus actuate the switch 106. Appropriate circuitry, not shown, is then energized to perform the desired functions, as will be obvious with reference to FIG. 7 which shows the cargo-loading system sequencing chart as one example of the utility of this system. The circuitry is believed to be within the ability of a skilled artisan to design and construct, and since the details per se of the circuitry are not part of the invention except in combination with other structural components, these details are not believed to be necessary to the teaching of this invention and therefore they are not set forth herein.

In this example, the aftmost position in a forward loading airplane is selected by a selector switch. In the chart shown, this would be position one. The containers and pallets of 8×10 size or multiples thereof enter the airplane at random spacing, as shown in sequence A. As container pallet number one gets within 10 feet of the selection position 1, the loading system automatically slows down and when it has reached a predetermined distance from the stowed position, which may be to 18 inches, it closes a limit switch such as shown in FIG. 6 and energizes the latch system for position 1. The latch pawls contact the side of the container pallet. The position 2 latch circuit is energized as soon as the position 1 latches are in place. This may be done by jackscrew motion closing limit switch when the pallet number 1 has reached the stowed position, and when the latch pawls enter the latch receptacles on the container, the pallet is automatically disengaged from the loading system drive. This may be done by deflating the tube shown in FIG. 3. At this point in time, the containers are positioned as shown in sequence D. When pallet number 2 reaches a predetermined distance from its stowed position, such as shown in sequence C, it closes a limit switch energizing the latch system for position 2 and when the latch is actuated and when the latch receptacles on the pallet become aligned with the latch pawls, the pawls engage the container and disengage the loading system drive from the pallet number 2. The containers are positioned as shown in sequence D. Similarly, when pallet number 3 reaches a position shown in D, the limit switches are closed and energize the latch system for position 3 and when the latch pawls engage the pallet number 3, the loading drive system becomes disengaged from pallet 3 and the containers are positioned as shown in sequence E. Container 4 is a double container. When it reaches a predetermined position shown in sequence E, a short distance from its stowed position, it energizes the position 4 circuit and when the position 4 latches are closed, the position 5 latch circuit is energized. Since position 5 limit switch is already closed because of the aft portion of the double container 4, the position 5 latch system closes the latches which, in turn, energizes the position 6 latch circuit, and this disengages the loading drive system under position 5. The containers are then positioned as shown in sequence F. When pallet number 5 is in the position shown and with the latches in position 5 already compressed, the latch pawls of position 6 are energized. As the pallet number 5 moves to its position shown in sequence G, the latch pawls enter the latch receptacles on the pallet and the loading drive system for that position is disengaged and thus all containers have been stowed and latched in position.

The unlatch function can be selected for any sequence of containers and pallets starting from the front of the airplane which would be position 6. This may be accomplished by means of selector switching on the operator's panel, not shown. As the unlatch function takes place, the cargo-loading drive system automatically engages the containers and moves them. Any remaining load in the aircraft may be repositioned as desired by using proper selections on the latch and unlatch selector switches at the operator's station.

Having thus described an illustrative embodiment of the present invention, it is to be understood that modifications thereof will become apparent to those skilled in the art and it is to be understood that these deviations are to be construed as part of the present invention.

We claim:

1. A cargo loading and restraint system comprising:
   a cargo deck having a plurality of storage stations extending longitudinally thereon,
   conveyor means for moving cargo pallets from station to station,
   locking means for locking said pallets at selected stations,
   sensing means operable by passage of pallets relative thereto to actuate locking means and disengage said conveyor means from said pallets, thereby positioning and restraining said pallets at selected stations,
   said conveyor means including means operable to engage and move pallets not yet reaching their assigned stations while disengaging those pallets properly stationed, and to sequentially stop, disengage from said conveyor means, and lock and said pallets into place consecutively along said stations.

2. A cargo loading and restraint system as in claim 1 wherein said locking means includes locking pawl, said pawl having means to sense the position of said pawl and to disengage said conveyor means from selected pallets upon actuation of said locking means.

3. A cargo loading and restraint system as set forth in claim 2 wherein said pawl is pivotally mounted on a mounting bracket and moved by overcenter linkage connected to an actuator.

4. A cargo loading and restraint system as set forth in claim 3 wherein said actuator is connected to said pawl in such manner as to permit limited relative movement therebetween.